United States Patent
Tham

(10) Patent No.: US 10,436,660 B2
(45) Date of Patent: Oct. 8, 2019

(54) PRESSURE TRANSDUCER AND METHOD FOR OPERATING SAME

(71) Applicant: Endress + Hauser GmbH + Co. KG, Maulburg (DE)

(72) Inventor: Anh Tuan Tham, Berlin (DE)

(73) Assignee: ENDRESS+HAUSER SE+CO.KG, Maulburg (DE)

(*) Notice: Subject to any disclaimer, the term of this patent is extended or adjusted under 35 U.S.C. 154(b) by 141 days.

(21) Appl. No.: 15/537,905

(22) PCT Filed: Nov. 18, 2015

(86) PCT No.: PCT/EP2015/076910
§ 371 (c)(1),
(2) Date: Jun. 20, 2017

(87) PCT Pub. No.: WO2016/102119
PCT Pub. Date: Jun. 30, 2016

(65) Prior Publication Data
US 2017/0343439 A1     Nov. 30, 2017

(30) Foreign Application Priority Data
Dec. 22, 2014 (DE) .................. 10 2014 119 400

(51) Int. Cl.
*G01L 9/00* (2006.01)

(52) U.S. Cl.
CPC .......... *G01L 9/0072* (2013.01); *G01L 9/0051* (2013.01)

(58) Field of Classification Search
CPC ............................ G01L 9/0072; G01L 9/0051
See application file for complete search history.

(56) References Cited

U.S. PATENT DOCUMENTS 5,024,097 A * 6/1991 Graeger ................. G01L 1/18
                                                            338/4
6,029,524 A   2/2000 Klauder
(Continued)

FOREIGN PATENT DOCUMENTS

CN        1142049 A     2/1997
CN        1401979 A     3/2003
(Continued)

OTHER PUBLICATIONS

German Search Report, German Patent Office, Munich, DE, dated Jul. 22, 2015.
(Continued)

*Primary Examiner* — Justin Seo
*Assistant Examiner* — John M Royston
(74) *Attorney, Agent, or Firm* — Bacon & Thomas, PLLC

(57) ABSTRACT

A pressure transducer for determining a pressure variable, comprising at least a pressure sensor with a measuring membrane and resistance elements integrated in the measuring membrane. The pressure sensor is arranged between a first and a second counter body, such that a pressure chamber forms between the measuring membrane and the first counter body, which pressure chamber can be subjected to a first pressure; wherein the side of the measuring membrane facing towards the second counter body can be subjected to a second pressure, and a displacement of the measuring membrane dependent upon the first and second pressures set. The pressure-dependent displacement of the measuring membrane can be detected by the resistance elements and, via a bridge voltage of a bridge circuit formed with the resistance elements, a pressure variable can be determined; wherein the measuring membrane has a membrane electrode and the second counter body has at least one counter body electrode on the side facing towards the (Continued)

measuring membrane, such that the membrane electrode and the counter body electrode form a capacitance, wherein, on the basis of the capacitance, at least one additional piece of information can be determined and/or at least one additional function of the pressure transducer can be performed.

14 Claims, 2 Drawing Sheets

(56) References Cited

U.S. PATENT DOCUMENTS

| | | | | |
|---|---|---|---|---|
| 6,434,456 | B1* | 8/2002 | Babala | G01L 15/00 |
| | | | | 180/197 |
| 7,706,995 | B2 | 4/2010 | Sullivan | |
| 8,511,151 | B2 | 8/2013 | Becher | |
| 9,625,335 | B2 | 4/2017 | Berlinger | |
| 2002/0174706 | A1* | 11/2002 | Gokhfeld | G01L 9/0072 |
| | | | | 73/1.57 |
| 2008/0255787 | A1* | 10/2008 | Sullivan | G01L 9/0072 |
| | | | | 702/87 |
| 2011/0303023 | A1* | 12/2011 | Becher | G01L 19/0046 |
| | | | | 73/862.581 |
| 2012/0197155 | A1* | 8/2012 | Mattes | A61B 5/0215 |
| | | | | 600/561 |
| 2017/0343439 | A1 | 11/2017 | Tham | |

FOREIGN PATENT DOCUMENTS

| | | |
|---|---|---|
| CN | 101720427 A | 6/2010 |
| CN | 102334019 A | 1/2012 |
| DE | 10 2007 027 274 A1 | 12/2008 |
| DE | 102007027274 A1 | 12/2008 |
| DE | 102009001133 A1 | 8/2010 |
| DE | 102011004722 A1 | 8/2012 |
| DE | 102013113171 A1 | 5/2015 |
| DE | 102014119400 A1 | 6/2016 |
| EP | 0 490 486 A2 | 6/1992 |
| EP | 2137505 B1 | 12/2009 |
| WO | 2008130867 A1 | 10/2008 |

OTHER PUBLICATIONS

International Search Report, EPO, The Netherlands, dated Feb. 25, 2016.
English Translation of the International Preliminary Report on Patentability, WIPO, Geneva, CH, dated Jul. 6, 2017.
Xhinese Office Action in corresponding Chinese Application No. CN 201580069365.2, dated Dec. 21, 2018.

* cited by examiner

PRESSURE TRANSDUCER AND METHOD FOR OPERATING SAME

TECHNICAL FIELD

The invention relates to a pressure transducer and a procedure for operating such a pressure transducer.

BACKGROUND DISCUSSION

The purpose of pressure transducers, among other things, is to register differential pressures; they are, for example, used in the differential pressure measurement sensors used in industrial measurement technology. They are there used for flow measurement or level indication, for example. For level indication, for example, the difference between a first pressure at the bottom of a container and a second pressure above the filling material is measured. The difference is proportional to a fill-level-dependent hydrostatic pressure in the container, which corresponds to the fill-level. For flow measurement, for example, a flow resistance is used in a line, and a difference between a first pressure before the resistance and a second pressure after the resistance is measured with the use of a differential pressure measurement sensor. This differential pressure is a measure of the flow rate in the line.

In pressure measurement equipment, pressure sensor semiconductor chips (e.g., silicon chips with doped resistance elements) are often used as pressure-sensitive elements. Such pressure sensor chips include a measuring membrane, one side of which is exposed to a first pressure, and the other side is exposed to a second pressure in measurement mode. The pressures involved create a displacement of the measuring membrane, which corresponds to the pressure to be measured. As a rule, pressure sensor chips are very sensitive and are, thus, not exposed directly to the medium whose pressure is to be detected. Instead, membrane seals filled with a liquid are installed upstream.

Pressure measurement sensors typically have a massive, multiple-component, metallic, measurement sensor block for this purpose, on which a first and a second, parallel and opposite to it, isolating membrane are arranged externally. The first isolating membrane closes a first pressure reception chamber that is connected to a first pressure measurement chamber via a pressure transfer line. Accordingly, the second isolating membrane closes a second pressure reception chamber that is connected to a second pressure measurement chamber via a pressure transfer line. The first and the second pressure measurement chambers are separated from each other by the measuring membrane of the differential pressure sensor.

Both the pressure reception chambers, both the pressure measurement chambers, as well as the pressure transfer lines are filled with a liquid that transfers pressure and whose purpose is to transfer the pressure that externally affects the corresponding isolating membrane to the corresponding side of the measuring membrane.

In day-to-day measurement operation, in such pressure transducers, malfunctions and even failures occur regularly. An additional problem that such pressure transducers have is that they are subject to a drift, which can result in the measured values for pressure being incorrect.

In order to, for example, recognize such malfunctions or a drift in the pressure transducer, it is necessary that the sensor be controlled during operation. This increases the reliability and/or the precision of the measured pressure values that are registered.

SUMMARY OF THE INVENTION

For this reason, the aim of the invention is to propose a pressure transducer that provides increased reliability of and/or precision in the measured pressure values. This aim is achieved with a pressure transducer and a procedure for operating such a pressure transducer.

With regard to the pressure transducer, the aim is achieved through a pressure transducer for determining a pressure value including at least one pressure sensor with a measuring membrane and the resistance elements integrated in the measuring membrane, wherein the pressure sensor is arranged between a first and a second counter body and is firmly connected in its peripheral zone to at least one counter body, so that a pressure chamber is formed between the measuring membrane and the first counter body and can be subjected to a first pressure; wherein the side of the measuring membrane facing the second counter body can be subjected to a second pressure, and a displacement of the measuring membrane dependent upon the first and the second pressures set; wherein the pressure-dependent displacement of the measuring membrane can be registered by the integrated resistance elements, and a measured pressure value can be determined via a bridge voltage of a bridge circuit formed with the integrated resistance elements; wherein the measuring membrane has a membrane electrode and the second counter body on the side facing the measuring membrane has at least one counter body electrode in the area of the measuring membrane, so that the membrane electrode and the counter body electrode create a capacitance, wherein, on the basis of this capacitance, at least one piece of additional information can be obtained and/or at least one additional function of the pressure transducer can be performed.

Thus, according to the invention, a capacitance is created by designing the measuring membrane as a membrane electrode and including a counter body electrode. In comparison to the pressure transducers known from the state of the art that use a resistive or capacitive resistance effect to determine a pressure value, the capacitance makes it possible to perform additional diagnostic functions. Such diagnostic functions include, for example, determining additional information about the pressure transducer and/or performing additional functions that are made possible based upon the introduced capacitance.

An advantageous configuration provides that the integrated resistance elements in relation to a substrate of the pressure sensor be designed as a p-n junction, and/or the membrane electrode in relation to the substrate be designed as a p-n junction.

Another advantageous configuration provides that an operating circuit for determining the capacitance and/or its course, for determining at least one piece of additional information, and/or for performing at least one additional function based upon the capacitance, be additionally included.

It is especially provided that the operating circuit be established to apply a variable or adjustable voltage at the membrane electrode and the counter body electrode.

Another advantageous configuration proposes that the second counter body contain plastic or ceramic.

An advantageous configuration proposes that the pressure sensor mostly contain silicon.

An advantageous configuration proposes that the membrane electrode be connected to the highest, voltage-wise, or the lowest point of the bridge circuit.

As far as the method is concerned, the aim according to the invention is achieved with a method for operating a pressure transducer according to one or more of the preceding claims, wherein the method includes the following steps:

Determining the capacitance and/or its course;

Determining at least one piece of additional information and/or performing at least one additional function based upon the capacitance.

An advantageous embodiment provides that a comparison of the bridge voltage and/or its course with a capacitance voltage corresponding to the capacitance and/or its course be performed, and, if the bridge voltage and/or its course and the capacitance voltage and/or its course match in a specified tolerance zone, the determined current measured pressure values to likely be trustworthy.

This embodiment especially provides that the fact that the bridge voltage and/or its course and/or the capacitance voltage and/or its course do not match in the specified tolerance zone be determined as additional information for a change in the pressure transducer.

Such a tolerance zone varies from membrane seal to membrane seal, depending (among other things) upon the purpose for which the membrane seal is to be used. Thus, for example, the tolerance zone of a low-cost membrane seal is significantly larger than that of a high-end membrane seal.

Thus, a tolerance zone of 1% of the measured value is advantageous, a tolerance zone of 0.5% preferable, and a tolerance zone of 0.2% particularly preferable.

Another advantageous embodiment provides that, based upon the capacitance and/or its course and/or the bridge voltage and/or its course, a drift in the bridge voltage be recognized as additional information.

The embodiment preferably provides that the capacitance and/or its course and the bridge voltage and/or its course be set as a ratio as a test criterion for recognizing the drift of the bridge voltage. It can especially preferably be provided that a drift of the bridge voltage be recognized if the capacitance and/or its course is mostly constant, i.e., it does not change as part of measurement resolution, and, if the bridge voltage is not constant, it changes.

Another advantageous embodiment provides that a test of a process membrane that separates the pressure transducer from a process medium be performed as an additional function, wherein an error is recognized in the process membrane if the capacitance and/or course changes, and the bridge voltage and/or its course is mostly constant.

Another advantageous embodiment provides that a test voltage be applied through the operating circuit to the membrane electrode and the counter body electrode, so that a change in distance between the membrane electrode and the counter body electrode is created, and a self-test is performed as an additional function, wherein the ratio of the bridge voltage and/or its course to the capacitance and/or its course is tested, and if this ratio is not within a pre-set tolerance zone, a change in the pressure transducer is recognized.

BRIEF DESCRIPTION OF THE DRAWINGS

The invention is explained in more detail based upon the following drawings. Illustrated are.

DETAILED DISCUSSION IN CONJUNCTION WITH THE DRAWINGS

Figure 1A:
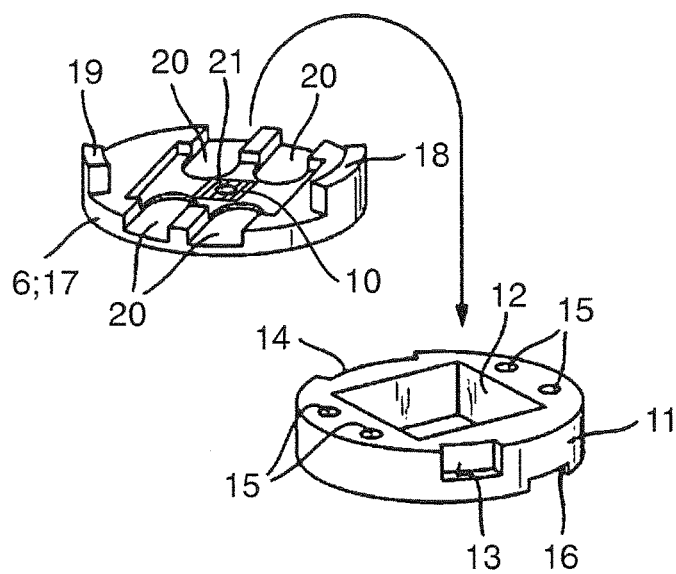
FIG. 1a: is a detailed view of a filling material and an insulator plate or a second counter body of a preferable configuration of the invention.

The filling material 11 shown in FIG. 1 mainly has a cylindrical basic form, inside of which there is a specifically square opening 12, in which a pressure sensor 2 is inserted. The shape of the opening 12 must match the shape of the pressure sensor 2 in such a way that there is a gap between the pressure sensor 2 and the filling material 11, which, on the one hand, prevents contact between the components and makes it possible to fully cover the surfaces of the pressure sensor 2 with the transfer fluid, and which, on the other hand, taking into account the above conditions, is designed to be as narrow as possible, to minimize the volume of the transfer fluid.

At the top, the filling material 11 has a first recess clearance 13 and a second recess clearance 14, whose purpose is to receive complementary first and second axial lugs 18, 19 at a second counter body 6 or an insulator plate 17.

The front surface of the filling material 11 in the presented configuration of the invention has a large, smooth surface sufficient for lifting and transporting the filling material 11 with a suction tool.

Four axial drilled holes 15 lead through the filling material 11 from its front surface; these can be used to lead electrical circuits to the pressure sensor 2. Furthermore, at the bottom of the filling material 11, there is a recess clearance 16, which acts as an exit opening for the transfer fluid when filling a fluid chamber located between a process membrane and the gap between the pressure sensor 2 and the filling material 11.

A disk-shaped insulator plate 17 is presented with its bottom side up in FIG. 1a. Along its perimeter, it has a first axial lug 18 and a second axial lug 19, wherein both the axial lugs are provided so that both the recess clearances along the perimeter of the top side of the filling material are positively locked. Provided that the lugs or the recess clearances differ from one another in size or are not distributed rotation-symmetrically around the cylinder axis of the filling material, the orientation of the insulation plate to the lid is unambiguously determined by the lugs. On its bottom side, the insulator plate 17 has four recess clearances 20 that are provided to make room for connection wires for making contact with the pressure sensor. There is an axial hole leading through the center of the insulator plate 17. It serves as a channel aligned with the center of a measuring membrane of the pressure sensor for the transfer fluid. This channel improves the dynamic response behavior of the pressure sensor, but it is not absolutely required. Furthermore, the insulator plate includes, according to the invention, a counter body electrode, which—when the insulator plate is positively locked with the filling material—creates a capacitance together with a membrane electrode, which includes the measuring membrane.

Figure 1B:
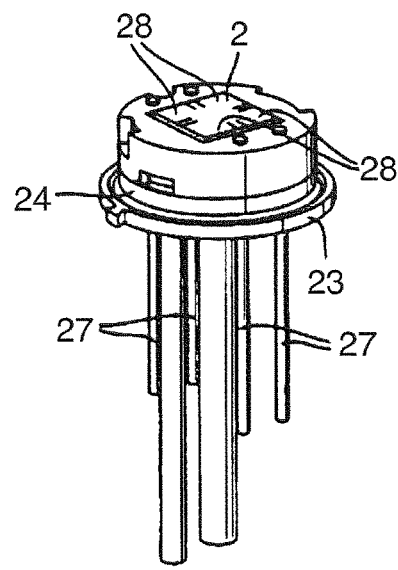
FIG. 1b: is a first spatial representation of the inventive pressure transducer (without the second counter body)

In FIG. 1b, a wall assembly 22 is presented, which includes a support body 23, to which the pressure sensor 2 is affixed with a pressure-retaining circuit, the details of which are not included here. The filling material 11 is arranged around the pressure sensor 2 and can be glued, for example, to the support body 23. The support body 23 includes a base plate 24 over which protrudes radially an annular seal edge 25. Along this seal edge 25, the support body 23 can be welded to a second wall assembly 26 to close up the fluid chamber. Four electric openings 27 extend through the base plate 24 of the support body 23 in an axial direction aligning with the holes 15 through the filling material 11, wherein the openings 27 have contact pins, which preferably extend in an axial direction up to the surface of the filling material 11. Likewise, the surface of the pressure sensor 2 aligns somewhat with the surface of the filling material 11. Thus, contact surfaces on the surface of the pressure sensor 2 can be connected to the contact pins automatically by an assembly robot using bond wire 28. The electric bushings 27 extend far from the bottom side of the support body 23, so that they can penetrate through a potting compound that will cover the bottom side of the body after a later stage of assembly.

Additionally, a reference air tube 29 extends through the base plate 24, leading approximately through the center of the base in an axial direction, to apply atmospheric pressure to the back of the measuring membrane of the pressure sensor 2. The embodiment example expressly relates to a relative pressure sensor. Of course, the invention also includes absolute pressure sensors, in which the measuring membrane seals an evacuated space on the rear side. In this case, no reference air path is present.

Furthermore, a filling pipe 30 extends through the base plate 24, ending under the recess clearance 16 of the filling material; through this filling pipe, the fluid chamber can be filled with a transfer fluid, or the ready pressure sensor can be filled.

Figure 1C:
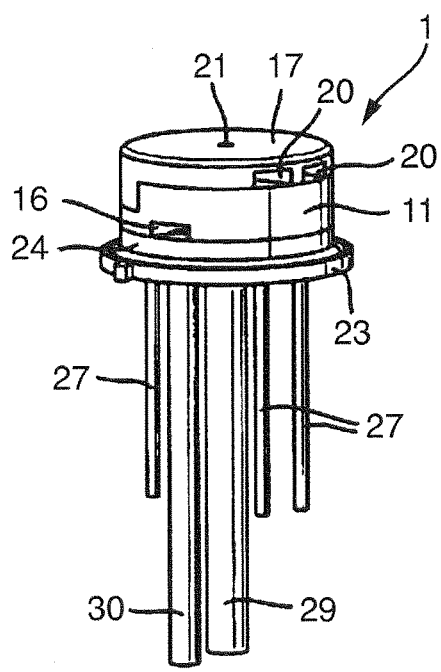
FIG. 1c: is a second spatial representation of the pressure transducer according to the invention (with the second counter body)

FIG. 1c shows the next stage in the assembly of the components from FIG. 1b, wherein the insulator plate 17 is additionally placed onto the filling material 11. The side recess clearances 20 on the bottom side of the insulator plate, on the other hand, provide the bond wires for contacting the pressure sensor 2 with the space required, and, on the other hand, serve as openings for the transfer fluid.

Figure 1D:
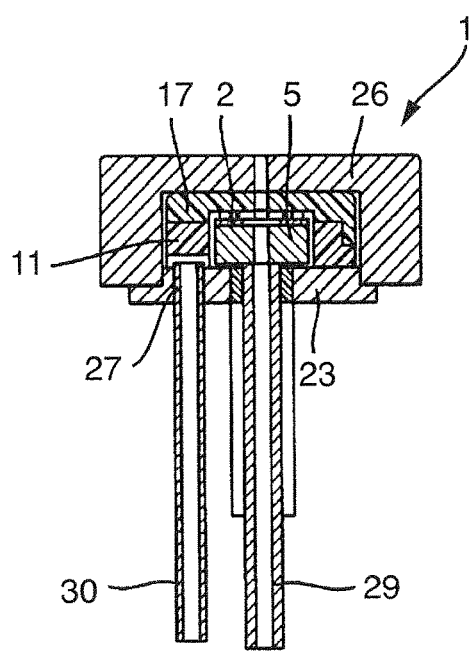
FIG. 1d: is a schematic longitudinal section through a pressure transducer according to the invention.

The sectional drawing in FIG. 1d show the next stage of assembly for manufacturing the pressure transducer. The second wall assembly 26 that is shown here in a simplified way includes a chamber hole 31, into which the parts mounted onto the support body 23, i.e., the filling material 11, the insulator plate 17, and the pressure sensor 2 with a first glass or semiconductor counter body 5 visible here under the pressure sensor 2, are inserted, wherein the support body 23 along its seal edge is welded pressure-tight to the second wall assembly 26.

As shown in FIG. 1d, a channel opens at the front side of the chamber hole 31; the channel is used to apply to the pressure sensor 2 a medium pressure to be measured through the fluid chamber using a transfer fluid. In doing so, the medium pressure is applied to the front-side surface of the measuring membrane 3 of the pressure sensor 2 that faces the channel, while to the rear-side surface of the measuring membrane 3 is applied atmospheric pressure via the reference air pipe or channel 29. As specified above, the embodiment example relates to a relative pressure sensor. Of course, the invention also includes absolute pressure sensors, in which the measuring membrane seals an evacuated space on the rear side. In this case, no reference air pipe is present.

The material of the filling material 11 and the insulator plate 17 comprise, for example, a temperature-resistant plastic that is chemically inert with respect to the transfer fluid, e.g., PPS.

Figure 2:
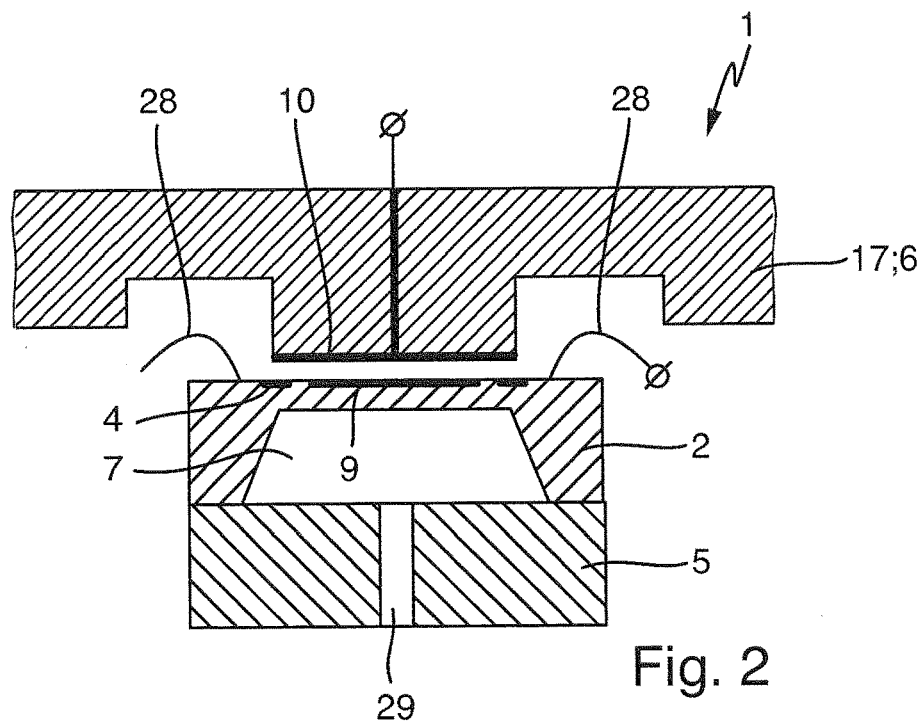
FIG. 2: is a schematic section of the pressure sensor located in the pressure transducer, as well as of the second counter body.
Figure 3:
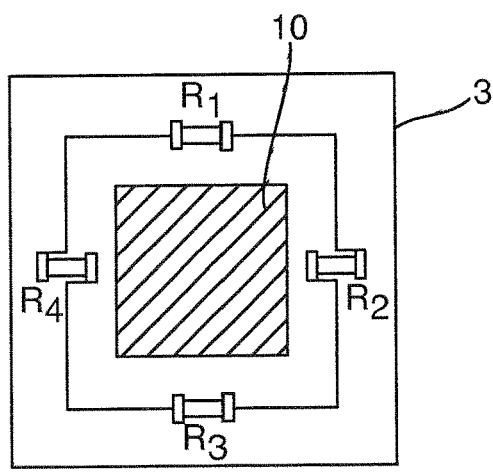
FIG. 3: is a top view of the pressure sensor located in the pressure transducer.

FIG. 2 provides for clarification a schematic section through the semiconductor pressure sensor 2 arranged between the first counter body 5 and the second counter body 6. As specified in the description for FIG. 1, the first counter body 5 can be a glass or semiconductor counter body, and the second counter body 6 can be designed as the insulator plate 17.

According to the invention, the pressure transducer 1 includes at least the pressure sensor 2 made using a conventional semiconductor method, with the measuring membrane 3 and (especially, piezo-resistive) resistance elements 4 integrated in the measuring membrane 3, as well as membrane electrode 9, which is also integrated in this embodiment example in the measuring membrane 3. There is another possible embodiment wherein the membrane electrode 9 is mounted in the form of an electrically conductive layer, e.g., a metallic layer.

The integrated resistors 4, as well as the membrane electrode 9, are introduced in the measuring membrane using a doping method, so that they have an increased doping as compared to their environment. To save an additional doping step, the resistance elements 4 and the membrane electrode 9 are doped in the same way, so that they are of the same doping type.

As shown in FIG. 2, the second counter body 6 or the insulator plate 17 have a counter body electrode 10. By mounting the insulator plate 17 at or on the filling material 11, both the electrodes 9 and 10 are arranged in such a way that a capacitance is created. In comparison to the pressure transducers 1 known from the state of the art that use a resistive or capacitive effect to determine a pressure value, the capacitance makes it possible to perform additional diagnostic functions. Such diagnostic functions include, for example, determining additional information about the pressure transducer and/or performing additional functions that are made possible based upon the introduced capacitance.

Figure 4:
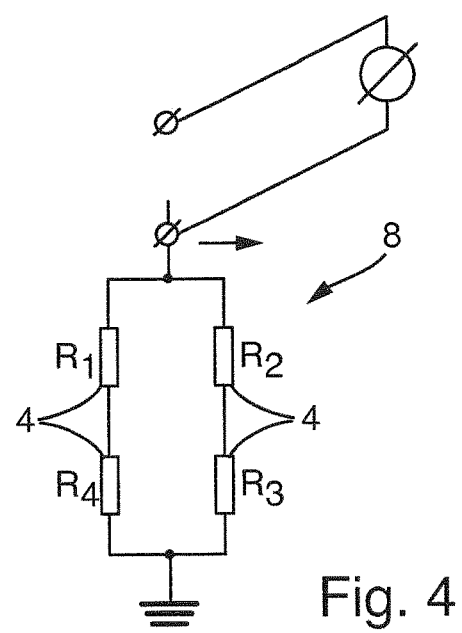
FIG. 4: is a schematic representation of a bridge circuit that is used to register the resistance values of the resistance elements.

The pressure sensor 2 additionally includes, as shown in FIG. 4, a bridge circuit 8 that is formed by means of the integrated resistance elements. The purpose of the bridge circuit 8 is to make it possible for a pressure-dependent displacement of the measuring membrane 3 to be registered through the piezo-resistive resistance elements 4, and a measured pressure value to be determined via a created bridge circuit $U_B$.

The membrane electrode 9 is connected to the upper- or lowermost voltage point of the bridge circuit 8—for example, via a line integrated in the measuring membrane 3.

Besides the bridge circuit 8, the pressure transducer 1 additionally includes the operating circuit 32, which is designed to apply a variable or adjustable voltage at or between the membrane electrode 9 and the counter body electrode 10. Furthermore, the operating circuit 8 is set up to perform the method described below or its steps, so as to obtain at least one piece of additional information and/or carry out one additional function.

The already indicated method provides as a first step that the capacitance and/or its course be determined. Based upon the determined capacitance and/or it course, a number of pieces of additional information can be determined through the pressure transducer 1.

Thus, for example, a redundant measurement or verification of the measured pressure value can be conducted. For this purpose, the bridge voltage $U_B$ and/or its course is compared to a capacitance voltage and/or its course corresponding to the capacitance and checked to see if the result lies within the pre-set tolerance zone.

If the result lies within the pre-set tolerance zone, the current measured pressure value determined via the integrated resistors and verified through the capacitance can, with high probability, be regarded as trustworthy or true, i.e., the currently determined measured pressure value may essentially be error-free.

If the result does not lie within the pre-set tolerance zone, it can be assumed that a change has taken place in the pressure transducer 1, and that the currently determined measured pressure value is only conditionally trustworthy, i.e., the currently determined measured pressure value is, with high probability, erroneous.

Besides the redundant measurement or verification of the measured pressure value and the additional information derived from it, drift detection can also be implemented—especially since additional information requires determining the presence of a drift in the bridge voltage due to changed resistance values of the resistance elements. The method provides here that, to decide if there is a drift or not, the capacitance and/or its course and the bridge voltage and/or its course be set as a ratio as a test criterion.

Furthermore, according to the method, it can be provided that a test of a process membrane can be performed as an additional function. The pressure transducers 1 described above are typically separated via a process membrane from the process medium whose medium pressure is to be measured. In order to now perform a test of the process membrane, the capacitance or its course and the bridge voltage and/or its course are compared to one another. In order to be able to now make a statement about the process membrane, it is tested whether or not the capacitance and/or its course change, while at the same time the bridge voltage and/or its course essentially do not. If this is so, there is a high probability of a defect in the process membrane.

Likewise, the operating circuit 32 can be set up in such a way that it performs a self-test of the pressure transducer 1. For this purpose, a test voltage is applied to or between the membrane electrode 9 and the counter body electrode 10. The applied test voltage, whose voltage value is variable or modifiable by means of operating circuit 32, then results in a change in distance between the two electrodes 9 and 10. During the application of the test voltage, the ratio of the bridge voltage and/or its course to the capacitance and/or its course is determined. Based upon this ratio, a statement can then be made as to whether or not there is a change in the pressure transducer.

If the ratio lies outside a tolerance zone, a change in the pressure transducer 1 is detected, and if the ratio is within the tolerance zone, no change in the pressure transducer is detected.

The invention claimed is:

1. A pressure transducer for determining a pressure variable, comprising:
    at least a pressure sensor with a measuring membrane and resistance elements integrated in said measuring membrane said pressure sensor is arranged between a first and a second counter body and is firmly connected in a peripheral zone to at least said first counter body, such that a pressure chamber is formed between said measuring membrane and said first counter body and can be subjected to a first pressure;
    a bridge circuit, wherein:
    the side of said measuring membrane facing said second counter body can be subjected to a second pressure, and a displacement of said measuring membrane dependent upon said first and said second pressures set;
    the pressure-dependent displacement of said measuring membrane can be registered by said integrated resistance elements, and a measured pressure value can be determined via a bridge voltage of said bridge circuit formed with said integrated resistance elements;
    said measuring membrane has a membrane electrode, and said second counter body on the side facing said measuring membrane has one counter body electrode at least in the area of said measuring membrane, so that said membrane electrode and said counter body electrode create a capacitance; and
    on the basis of this capacitance, at least one piece of additional information can be obtained and/or at least one additional function of the pressure transducer can be performed.

2. The pressure transducer according to claim 1, wherein:
    said integrated resistance elements in relation to a substrate of the pressure sensor are designed as a p-n junction, and/or said membrane electrode in relation to the substrate is designed as a p-n junction.

3. The pressure transducer according to claim 1, further comprising:
    an operating circuit for determining the capacitance and/or its course, for determining at least one piece of additional information and/or for performing at least one additional function based upon the capacitance.

4. The pressure transducer according to claim 3, wherein:
    said operating circuit is established to apply a variable or adjustable voltage at said membrane electrode and said counter body electrode.

5. The pressure transducer according to claim 1, wherein:
    said second counter body is made of plastic or ceramic.

6. The pressure transducer according to claim 1, wherein:
    said pressure sensor is mainly made of silicon.

7. The pressure transducer according to claim 1, wherein:
    said membrane electrode is connected to the highest, voltage-wise, or the lowest point of said bridge circuit.

8. A method for operating a pressure transducer according to claim 1, includes the following steps:
    determining the capacitance and/or its course;
    determining at least one piece of additional information; and/or
    performing at least one additional function based upon said capacitance.

9. The method according to claim 8, wherein:
    a comparison of the bridge voltage and/or its course with a capacitance voltage corresponding to the capacitance and/or its course is performed, and if the bridge voltage and/or its course and the capacitance voltage and/or its course match in a specified tolerance zone, the determined current measured pressure values are likely to be trustworthy.

10. The method according to claim 9, wherein:
    in case the bridge voltage and/or its course and/or the capacitance voltage and/or its course do not match in the specified tolerance zone, a change in the pressure transducer is determined as additional information.

11. The method according to claim 8, wherein:
based upon the capacitance and/or its course and/or the bridge voltage and/or its course, a drift in the bridge voltage is recognized as additional information.

12. The method according to claim 11, wherein:
the capacitance and/or its course and the bridge voltage and/or its course are set as a ratio as a test criterion for recognizing the drift of the bridge voltage.

13. The method according to claim 8, wherein:
a test of a process membrane that separates the pressure transducer from a process medium is performed as an additional function, wherein an error is recognized in the process membrane if the capacitance and/or course changes, and the bridge voltage and/or its course is mostly constant.

14. The method according to claim 8, wherein:
a test voltage is applied through the operating circuit to the membrane electrode and the counter body electrode, so that a change in distance between the membrane electrode and the counter body electrode is created, and a self-test is performed as an additional function, whereby the ratio of the bridge voltage and/or its course to the capacitance and/or its course is tested, and if this ratio is not within a pre-set tolerance zone, a change in the pressure transducer is recognized.

* * * * *